P. F. W. C. KRIPPENDORF.
POWER TRANSMISSION BELT.
APPLICATION FILED MAR. 21, 1908.
949,124.
Patented Feb. 15, 1910.
Fig. 1.
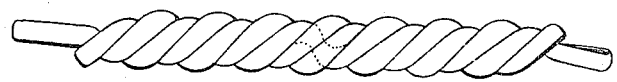
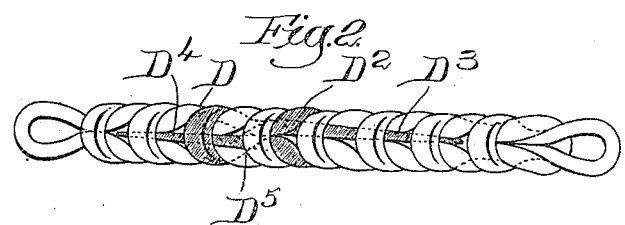
Fig. 3.
Fig. 4.
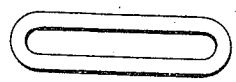
Fig. 5.
Fig. 6.
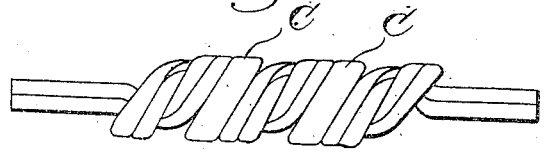
Witnesses.
Thomas J. Drummond.
Edward G. Allen.
Inventor.
Paul F. W. C. Krippendorf,
By Crosby Gregory
Att'ys.

UNITED STATES PATENT OFFICE.

PAUL F. W. C. KRIPPENDORF, OF LYNN, MASSACHUSETTS.

POWER-TRANSMISSION BELT.

949,124.　　　　Specification of Letters Patent.　　Patented Feb. 15, 1910.

Application filed March 21, 1908. Serial No. 422,435.

*To all whom it may concern:*

Be it known that I, PAUL F. W. C. KRIPPENDORF, a citizen of the United States, and a resident of Lynn, in the county of Essex and State of Massachusetts, have invented an Improvement in Power-Transmission Belts, of which the following description, in connection with the accompanying drawing, is a specification, like letters on the drawing representing like parts.

This invention resides in a belt for the transmission of power and is particularly designed for use of comparatively small sized belts, such as employed in the driving of sewing and other similar machines.

The object of the invention is to provide a belt which can be brought into endless form without the use of wire hooks or other similar connections, and at the same time to provide a belt which can be made from scraps of material which would otherwise be considered waste, and yet which at the same time shall be a strong, durable and inexpensive belt.

The invention resides in a belt made up of a series of endless links, and connecting links, all of which are cut out of suitable material, preferably leather.

The nature of the invention will more fully appear from the accompanying description and drawings and will be particularly pointed out in the claims.

The drawings illustrate preferred forms of sections of the belt as made of leather.

Figure 1 is a side elevation of a section of one form of the belt, at the point where a connecting link is employed. Fig. 2 is a top plan view of the construction shown in Fig. 1. Fig. 3 is a view of a single link. Fig. 4 is a view showing two adjacent links and the arrangement of their connection or interlocking. Fig. 5 is a top plan view of a section of a similar belt where the members are made up of two superimposed links. Fig. 6 is a side elevation of a belt similar to that shown in Fig. 5, but with the additional element of intermediate washers.

The belt of this invention is made up of what are herein termed endless links, presenting a central opening such as shown in Fig. 3. These links in the preferred form of belt are designed to be cut or punched out of scrap or waste leather. They may be cut in the shape shown in Fig. 3, or any other endless shape and stretched or drawn into this form. The diameter of the belt will depend upon the size and proportions of the link, and the links for different sized belts may be formed by cutting or punching out several links concentrically; that is, one inside of the other.

The belt is made up of a series of independent members; that is, each member is unconnected and separate from the other, and the members are only united by the interlocking or interlooping of the one with the other. These members may be composed of one or of a plurality of links, such as shown in Fig. 3. In the belt shown in Figs. 1 and 2 each member is made up of a single link, while in the belt shown in Figs. 5 and 6 each member is made up of two superimposed layers.

The members, whether composed of one or a plurality of superimposed links, are joined together to form the belt by causing the adjacent ends of adjacent members to pass through the openings of each other.

Referring for example to Fig. 4, wherein two adjacent members A and B each composed of a single link are illustrated, it will be seen that the closed end $B^2$ of the member B is passed through the opening of the member A at the end $A^2$ and that the opening of the member B at the end $B^2$ is also itself passed through by the closing end $A^2$ of the member A. When the members are composed of a plurality of superimposed links the arrangement is exactly the same, because the links lie one upon the other and in the formation of the chain may be regarded in the same way as single links.

With links of some proportions spaces may occur on each member between the ends of adjacent members, and in such cases washers may be used to fill these spaces, as shown in Fig. 6, wherein the washers are indicated at C surrounding each member between the ends of the two adjacent members.

The belt is made up throughout of the members arranged as thus described, but in order to bring the belt into endless form and cause it to present a closed or endless series of members, it is necessary to make use of a connecting link which is not closed or endless but is open. It would be impossible to insert a closed or endless link into the series so as to form a continuous series. The open link is, however, placed in position and formed into the belt in the same manner as one of the endless links, except that its ends are elongated and passed through and are retained in position by the adjacent members of the series. One of these connecting open links is indicated at D, D², D³, D⁴, from whence it will be seen that the link can be placed in the same position as the closed links by means of the free ends D³, D⁴, which are then passed in opposite directions through the ends of the adjacent links, by which they are held in position. If the ends D³ and D⁴ were cut off at the point D⁵ and the strip forming the link fastened together at that point, the link would be, but for the break in integrality, the same as one of the closed links, and would have the same position in the belt.

In the manufacture of the belt after the members of the series have been interlocked the belt is then suitably treated to make uniform its cross sectional area throughout, and to remove, so far as possible, the tendency to stretch. These results, when the belt is made of leather, as is preferred, are best secured by dampening the leather and passing the belt through slightly separated pairs of rolls, one pair running at a greater speed than the other pair. The repetition of this operation turning the belt axially each time and preferably using rollers presenting concave peripheries, serves to compact and interembed the leather of the links to render the cross-sectional area throughout substantially uniform, and to remove a very large proportion of the stretch or tendency to stretch from the belt.

The belt may be furnished to the user with the connecting links inserted by the manufacturer, or it may be furnished in sections, together with the strips or connecting links, and these may be readily inserted by the user. Whenever the belt breaks it is only necessary to remove and throw away the particular link which is broken and insert one of the connecting links, and the belt will possess the same strength.

Having described my invention, what I claim as new and desire to secure by Letters Patent, is:

1. A power transmission belt composed of a series of independent members, each member comprising an endless link of suitable material presenting a central opening, each member of the series having a closed end passed through the openings of both the adjacent members and having its opening passed through by a closed end of both the adjacent members.

2. A power transmission belt composed of a series of independent members, each member comprising a plurality of superimposed endless links of suitable material presenting a central opening, each member of the series having a closed end passed through the openings of both the adjacent members and having its opening passed through by a closed end of both the adjacent members.

3. A power transmission belt composed of a closed series of independent members of suitable material, each member, with the exception of the connecting members, comprising an endless link, the connecting members comprising an open link with elongated ends, each member of the series passing through and being passed through by both the adjacent members, the ends of the open link being extended in opposite directions through adjacent endless links.

4. A power transmission belt composed of a series of independent members, each member comprising a plurality of superimposed endless links of suitable material, each member of the series passing through and being passed through by both the adjacent members, and washers surrounding each member between the ends of the two adjacent members.

5. A power transmission belt comprising a series of independent members, each member comprising an endless link of suitable material, each intermediate member of the series passing through and being passed through by both the adjacent members, a strip of material bent into the form of a link with its free ends projecting in opposite directions therefrom, each end of link so formed passing through and being passed through by the links of the end members of the series and the said free ends passing through and held by the adjacent endless links.

In testimony whereof, I have signed my name to this specification, in the presence of two subscribing witnesses.

PAUL F. W. C. KRIPPENDORF.

Witnesses:
MABEL PARTELOW,
THOMAS J. DRUMMOND.